US008717526B2

(12) United States Patent  
Shigekura et al.

(10) Patent No.: US 8,717,526 B2  
(45) Date of Patent: May 6, 2014

(54) LIQUID CRYSTAL DISPLAY DEVICE AND MANUFACTURING METHOD THEREOF

(75) Inventors: Yukari Shigekura, Mobara (JP); Hiroshi Miyairi, Mobara (JP); Yasuyuki Yamada, Mobara (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 902 days.

(21) Appl. No.: 12/883,387

(22) Filed: Sep. 16, 2010

(65) Prior Publication Data

US 2011/0075090 A1    Mar. 31, 2011

(30) Foreign Application Priority Data

Sep. 29, 2009  (JP) ................... 2009-224179

(51) Int. Cl.  
*G02F 1/1339*  (2006.01)  
*G02F 1/13*  (2006.01)

(52) U.S. Cl.  
USPC ........................ 349/153; 349/154; 349/187

(58) Field of Classification Search  
None  
See application file for complete search history.

(56) References Cited

U.S. PATENT DOCUMENTS

| 7,630,050 | B2 | 12/2009 | Kobayashi et al. |
| 8,325,319 | B2 | 12/2012 | Ikeguchi |
| 8,330,926 | B2 * | 12/2012 | Soma ..................... 349/152 |
| 2002/0030784 | A1 * | 3/2002 | Onaka et al. ............. 349/153 |
| 2002/0167634 | A1 * | 11/2002 | Watanabe et al. ......... 349/153 |
| 2003/0103181 | A1 * | 6/2003 | Imayama et al. ......... 349/122 |
| 2008/0094563 | A1 * | 4/2008 | Lee ......................... 349/153 |
| 2011/0075090 | A1 * | 3/2011 | Shigekura et al. ........ 349/153 |

FOREIGN PATENT DOCUMENTS

| JP | 2002-350874 | 12/2002 |
| JP | 2006-030439 | 2/2006 |
| JP | 2007-212667 | 8/2007 |
| JP | 2008-309863 | 12/2008 |

OTHER PUBLICATIONS

Office Action in corresponding Japanese Patent Application No. 2009-224179, mailed May 14, 2013.

* cited by examiner

*Primary Examiner* — Tina Wong  
(74) *Attorney, Agent, or Firm* — Antonelli, Terry, Stout & Kraus, LLP.

(57) ABSTRACT

A liquid crystal display device includes a first substrate and a second substrate which are disposed to face each other with liquid crystal interposed therebetween and a sealing material which is disposed between the first substrate and the second substrate to seal the liquid crystal, wherein a side surface of the liquid crystal display device has a cut surface, and a first resin layer which is formed along the sealing material and has a height less than a gap between the first substrate and the second substrate in a display region and the sealing material are exposed at the cut surface.

6 Claims, 6 Drawing Sheets

LIQUID CRYSTAL DISPLAY DEVICE AND MANUFACTURING METHOD THEREOF

CROSS-REFERENCE TO RELATED APPLICATION

The present application claims priority from Japanese application JP 2009-224179 filed on Sep. 29, 2009, the content of which is hereby incorporated by reference into this application.

BACKGROUND OF THE INVENTION

1. Field of the Invention

The present invention relates to a liquid crystal display device and a manufacturing method thereof, and more particularly to a liquid crystal display device with a narrow frame structure and a manufacturing method thereof.

2. Description of the Related Art

In a liquid crystal display device, a pair of substrates (hereinafter respectively referred to as a first substrate and a second substrate) which are disposed to face each other with liquid crystal interposed therebetween and a sealing material which is formed between the first substrate and the second substrate to seal the liquid crystal constitute an envelope. A region surrounded by the sealing material serves as a display region. The display region includes a number of pixels arranged in a matrix.

In the manufacture of the liquid crystal display device, a pair of so-called multi-piece substrates in which the display region is fabricated are bonded together by the sealing material and thereafter cut to be separated into a plurality of liquid crystal cells (corresponding to the envelopes).

In this case, the pair of multi-piece substrates are cut along substantially the center of a region where the sealing material is formed, that is, they are cut such that the sealing material is divided into right and left parts in adjacent liquid crystal cells. Therefore, the distance between the cut surface of the substrates and the display region can be reduced in each of the liquid crystal cells, which provides a liquid crystal display device with a narrow frame.

In the thus configured liquid crystal display device, side surfaces of the first substrate and the second substrate have a portion which is configured of a cut surface formed by collectively cutting the first substrate and the second substrate along the portion where the sealing material is formed.

Examples of related art document of the invention include JP-A-2007-212667 (corresponding to U.S. Pat. No. 7,630,050) and JP-A-2006-30439. JP-A-2007-212667 describes a liquid crystal display panel in which a weir is disposed in a forming region of a sealing material formed at a distance from a side surface of a substrate, and the so-called intrusion of liquid crystal is prevented by the weir. JP-A-2006-30439 describes the manufacture of a liquid crystal display device in which a pair of multi-piece substrates are bonded together via a sealing material, and the pair of multi-piece substrates are collectively cut along substantially the center of the sealing material. In the manufacture, a narrow resin layer is previously disposed at substantially the center of the sealing material, and the pair of multi-piece substrates are collectively cut along substantially the center of the resin layer. The resin layer in this case is formed in a state where the top thereof abuts on the other multi-piece substrate.

SUMMARY OF THE INVENTION

However, the above-described liquid crystal display device with a narrow frame structure is configured such that the sealing material occupies and is exposed in most of the area between the first substrate and the second substrate at a surface where the first substrate and the second substrate are collectively cut.

In some cases, therefore, the intrusion of moisture cannot be sufficiently blocked at the cut surface by only the sealing material. Accordingly, it is desired to avoid the intrusion of moisture as much as possible by a more elaborate configuration.

In this case, the liquid crystal display device shown in JP-A-2006-30439 is configured such that the resin material occupies and is exposed in most of the area between the first substrate and the second substrate at the surface where the first substrate and the second substrate are collectively cut. Since a resin material has greater moisture resistance than a sealing material, the intrusion of moisture can be reliably prevented. However, when the first substrate and the second substrate are formed by collectively cutting the multi-piece substrates, the resin layer harder than the sealing material impairs the cutting workability of the multi-piece substrates.

In the above-described liquid crystal display device with the narrow frame structure, when the sealing material is formed by applying on the multi-piece substrate, there arises a disadvantage in that the sealing material flows into the display region because the sealing material is formed in a pattern which surrounds the display region in each liquid crystal cell.

It is an object of the invention to provide a liquid crystal display device with a narrow frame structure which is configured by cutting multi-piece substrates and in which the cutting performance for the multi-piece substrates is improved and an advantage of preventing moisture intrusion at a cut surface is provided, and a manufacturing method of the liquid crystal display device.

In addition to the above-described object, it is another object of the invention to provide a liquid crystal display device in which flowing of a sealing material into a display region is prevented, and a manufacturing method of the liquid crystal display device.

For example, the liquid crystal display device of the invention is configured such that a resin material and a sealing material, for example, are exposed in layers at the same rate between a first substrate and a second substrate at a surface where the first substrate and the second substrate are collectively cut.

The invention can be configured as follows, for example.

(1) A liquid crystal display device of the invention includes: a first substrate and a second substrate which are disposed to face each other with liquid crystal interposed therebetween; and a sealing material which is disposed between the first substrate and the second substrate to seal the liquid crystal, the first substrate and the second substrate having side surfaces including a cut surface formed by cutting the first substrate and the second substrate along a portion where the sealing material is disposed, wherein a first resin layer is provided along the sealing material in a region where the sealing material is disposed on the first substrate or the second substrate, the first resin layer has a height less than a gap between the first substrate and the second substrate in a display region, and the first resin layer and the sealing material are exposed at the surface where the first substrate and the second substrate are cut.

(2) According to the liquid crystal display device of the invention, in (1), the liquid crystal display device further includes a columnar spacer in the display region surrounded by the sealing material, wherein the columnar spacer is formed on the second substrate side, and the first resin layer is formed on the second substrate side and formed of the same material as that of the columnar spacer.

(3) According to the liquid crystal display device of the invention, in (1), a second resin layer is formed apart from the first resin layer on the display region side of the region where the sealing material is disposed, and the second resin layer has a height greater than that of the first resin layer.

(4) According to the liquid crystal display device of the invention, in (3), the columnar spacer is formed on the second substrate side, and the first resin layer and the second resin layer are formed on the second substrate side and formed of the same material as that of the columnar spacer.

(5) According to the liquid crystal display device of the invention, in (4), the second resin layer has a height greater than that of the first resin layer due to an intervening layer formed between the second resin layer and the second substrate.

(6) According to the liquid crystal display device of the invention, in (1), a second resin layer is formed close or adjacent to the first resin layer in the region where the sealing material is disposed, and the second resin layer has a height greater than that of the first resin layer and has a plurality of openings formed in parallel when viewed in a plane.

(7) According to the liquid crystal display device of the invention, in (6), the columnar spacer is formed on the second substrate side, and the first resin layer and the second resin layer are formed on the second substrate side and formed of the same material as that of the columnar spacer.

(8) According to the liquid crystal display device of the invention, in (7), the second resin layer has a height greater than that of the first resin layer due to an intervening layer formed between the second resin layer and the second substrate.

(9) A liquid crystal display device of the invention includes: a first substrate and a second substrate which are disposed to face each other with liquid crystal interposed therebetween; and a sealing material which is disposed between the first substrate and the second substrate to seal the liquid crystal, the first substrate and the second substrate having side surfaces including a portion configured of a cut surface formed by cutting the first substrate and the second substrate along a portion where the sealing material is disposed, wherein first resin layers which are discontinuously formed in parallel along the sealing material are provided in the region where the sealing material is disposed on the first substrate or the second substrate, and the first resin layer and the sealing material are exposed at the cut surface of the first substrate and the second substrate.

(10) According to the liquid crystal display device of the invention, in (9), the liquid crystal display device further includes a columnar spacer in a display region surrounded by the sealing material, wherein the columnar spacer is formed on the second substrate side, and the first resin layer is formed on the second substrate side and formed of the same material as that of the columnar spacer.

(11) According to the liquid crystal display device of the invention, in (9), a second resin layer is formed apart from the first resin layer on the display region side of the region where the sealing material is disposed, and the second resin layer has a height greater than that of the first resin layer.

(12) According to the liquid crystal display device of the invention, in (11), the columnar spacer is formed on the second substrate side, and the first resin layer and the second resin layer are formed on the second substrate side and formed of the same material as that of the columnar spacer.

(13) According to the liquid crystal display device of the invention, in (12), the second resin layer has a height greater than that of the first resin layer due to an intervening layer formed between the second resin layer and the second substrate.

(14) According to the liquid crystal display device of the invention, in (9), a second resin layer is formed close or adjacent to the first resin layer in the region where the sealing material is disposed, and the second resin layer has a height greater than that of the first resin layer and has a plurality of openings formed in parallel when viewed in a plane.

(15) According to the liquid crystal display device of the invention, in (14), the columnar spacer is formed on the second substrate side, and the first resin layer and the second resin layer are formed on the second substrate side and formed of the same material as that of the columnar spacer.

(16) According to the liquid crystal display device of the invention, in (15), the second resin layer has a height greater than that of the first resin layer due to an intervening layer formed between the second resin layer and the second substrate.

(17) A manufacturing method of a liquid crystal display device of the invention includes: applying a sealing material in a pattern which is continuous and closed on a surface of a first multi-piece substrate; bonding a second multi-piece substrate to the first multi-piece substrate with a gap via the sealing material; and forming a liquid crystal cell by at least collectively cutting the first multi-piece substrate and the second multi-piece substrate along the sealing material in a forming region of the sealing material, wherein a resin layer having a height less than the gap is formed at the cutting position in the forming region of the sealing material on at least one of the first multi-piece substrate and the second multi-piece substrate before applying the sealing material.

(18) A manufacturing method of a liquid crystal display device of the invention includes: applying a sealing material in a pattern which is continuous and closed on a surface of a first multi-piece substrate; bonding a second multi-piece substrate to the first multi-piece substrate so as to face each other via the sealing material; and forming a liquid crystal cell by at least collectively cutting the first multi-piece substrate and the second multi-piece substrate along the sealing material in a forming region of the sealing material, wherein a plurality of discontinuous resin layers are formed along the cutting position at the cutting position in the forming region of the sealing material on at least one of the first multi-piece substrate and the second multi-piece substrate before applying the sealing material.

The above-described configurations are illustrative only, and the invention can be modified appropriately within a range not departing from the technical idea thereof. Exemplary configurations of the invention other than the above-described configurations will be apparent from the entire description of the specification and the drawings.

According to the thus configured liquid crystal display device and the manufacturing method thereof, it is possible to obtain a narrow frame structure which is configured by cutting the multi-piece substrates, and in which the cutting performance for the multi-piece substrates is improved and an advantage of preventing moisture intrusion at a cut surface is provided.

Other advantages of the invention will be apparent from the entire description of the specification.

DESCRIPTION OF THE PREFERRED EMBODIMENTS

Figure 1A:
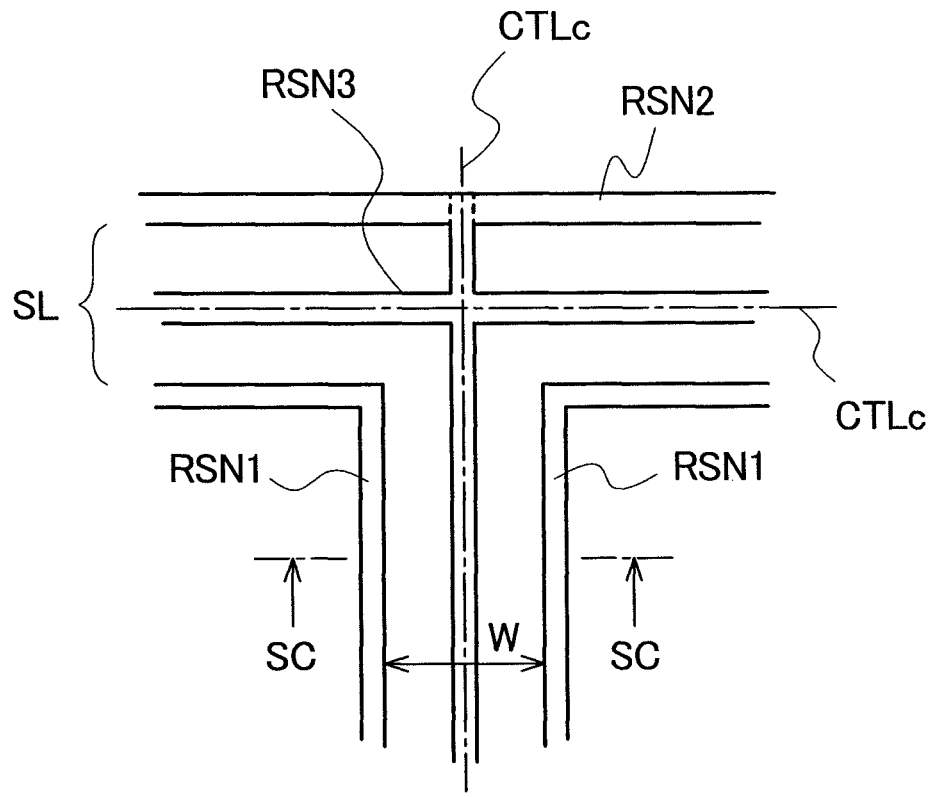
FIGS. 1A and 1B are configuration views of a main part showing a first embodiment of a liquid crystal display device of the invention, which are enlarged views of a dotted circle portion Q in FIG. 3.

Embodiments of the invention will be described with reference to the drawings. In the drawings and embodiments, the same reference numerals and signs are assigned to the same or similar constituent elements, and the description thereof is omitted.

[First Embodiment]

Figure 2A:
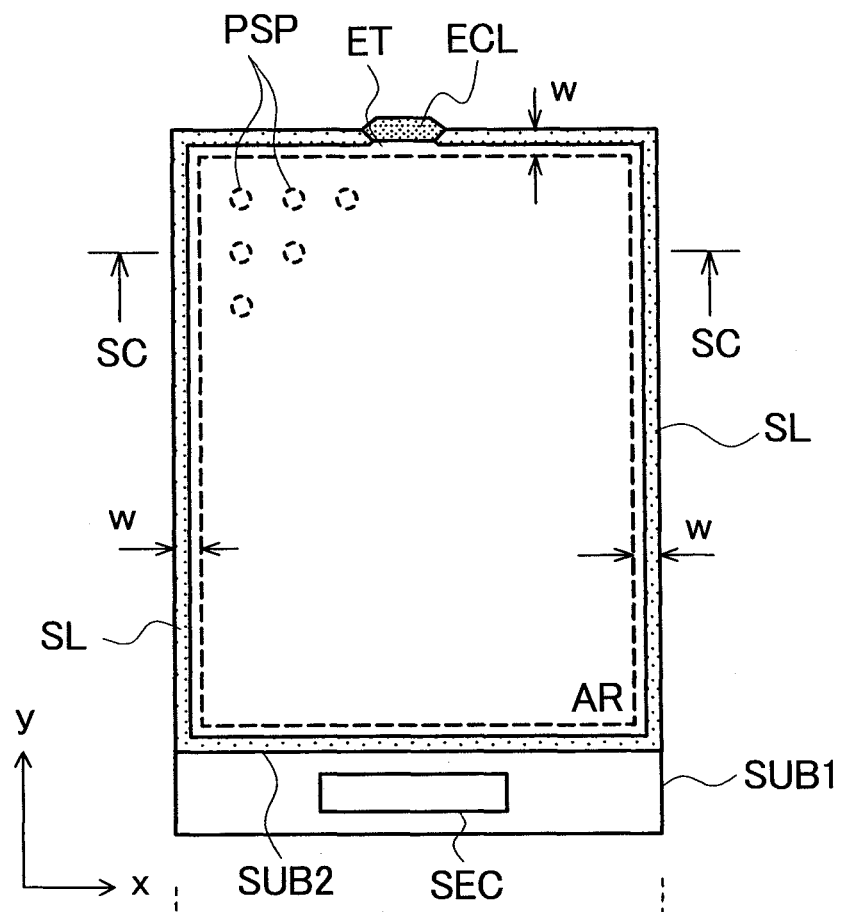
FIGS. 2A and 2B are schematic configuration views showing the first embodiment of the liquid crystal display device of the invention.
Figure 2B:
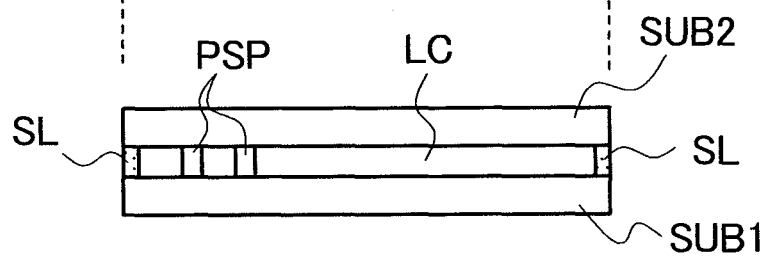

FIGS. 2A and 2B are schematic configuration views showing a first embodiment of a liquid crystal display device of the invention. FIG. 2A is a plan view, and FIG. 2B is a cross-sectional view taken along line SC-SC of FIG. 2A.

In FIGS. 2A and 2B, a substrate SUB1 and a substrate SUB2 which are disposed to face each other with liquid crystal LC interposed therebetween are shown. The substrate SUB2 faces the substrate SUB1 so as to expose a part of the substrate SUB1 on the lower side in the drawing and has a smaller area than that of the substrate SUB1. A semiconductor device (chip) SEC is mounted on the part of the substrate SUB1 on the lower side in the drawing. The semiconductor device SEC drives each pixel in a later-described display region (display part) AR.

At the periphery of the substrate SUB2, a sealing material SL is disposed between the substrate SUB1 and the substrate SUB2. The substrate SUB1 and the substrate SUB2 are fixed to each other by the sealing material SL. Moreover, the sealing material SL seals the liquid crystal LC interposed between the substrate SUB1 and the substrate SUB2. In FIG. 2A, an opening ET is disposed at a part of the sealing material SL, and a sealant ECL for closing the opening ET is formed. This is because a so-called liquid crystal filling method is employed when the liquid crystal is sealed between the substrate SUB1 and the substrate SUB2. When a liquid crystal dropping method is employed for example, the opening ET of the sealing material SL and the sealant ECL are not present. Therefore, the opening ET of the sealing material SL and the sealant ECL may be not formed.

Although not shown in FIGS. 2A and 2B, in the arrangement region of the sealing material SL, a narrow, continuous resin layer (second resin layer indicated by reference sign RSN1 in FIGS. 1A and 1B) is formed along the longitudinal direction of the sealing material SL on an inner circumference side thereof which is the display region side, and a narrow, continuous resin layer (first resin layer indicated by reference sign RSN3 in FIGS. 1A and 1B) is formed along the longitudinal direction of the sealing material SL at the outer circumference side thereof which is the side-wall surface portion of the substrates SUB1 and SUB2. Such a configuration will be apparent from the description with reference to FIGS. 1A and 1B described in detail later.

In the region surrounded by the sealing material SL, the display region (display part) AR is formed such that the outline thereof (indicated by the dotted line in the drawing) is close to the sealing material SL. Although not shown in the drawing, signal lines connected to the semiconductor device SEC, switching elements for selecting pixels, pixel electrodes, and the like are formed in the display region AR on a surface of the substrate SUB1 on the liquid crystal LC side. Although not shown in the drawing, a black matrix, color filters, and the like are formed in the display region AR on a surface of the substrate SUB2 on the liquid crystal LC side.

On the other three sides of the substrate SUB2 excluding the side on the semiconductor device SEC side, each of the side surfaces is configured to be flush with a side surface of the sealing material SL and a side surface of the substrate SUB2. That is, when viewed in a plane, the sealing material SL is formed with no gap between the side surfaces of the substrate SUB1 and the substrate SUB2 so as to reach the side surfaces of the substrate SUB1 and the substrate SUB2. With this configuration, a distance (indicated by w in the drawing) from the side surfaces of the substrate SUB1 and the substrate SUB2 to the display region AR can be greatly reduced, whereby a narrow frame configuration can be achieved.

Figure 3:
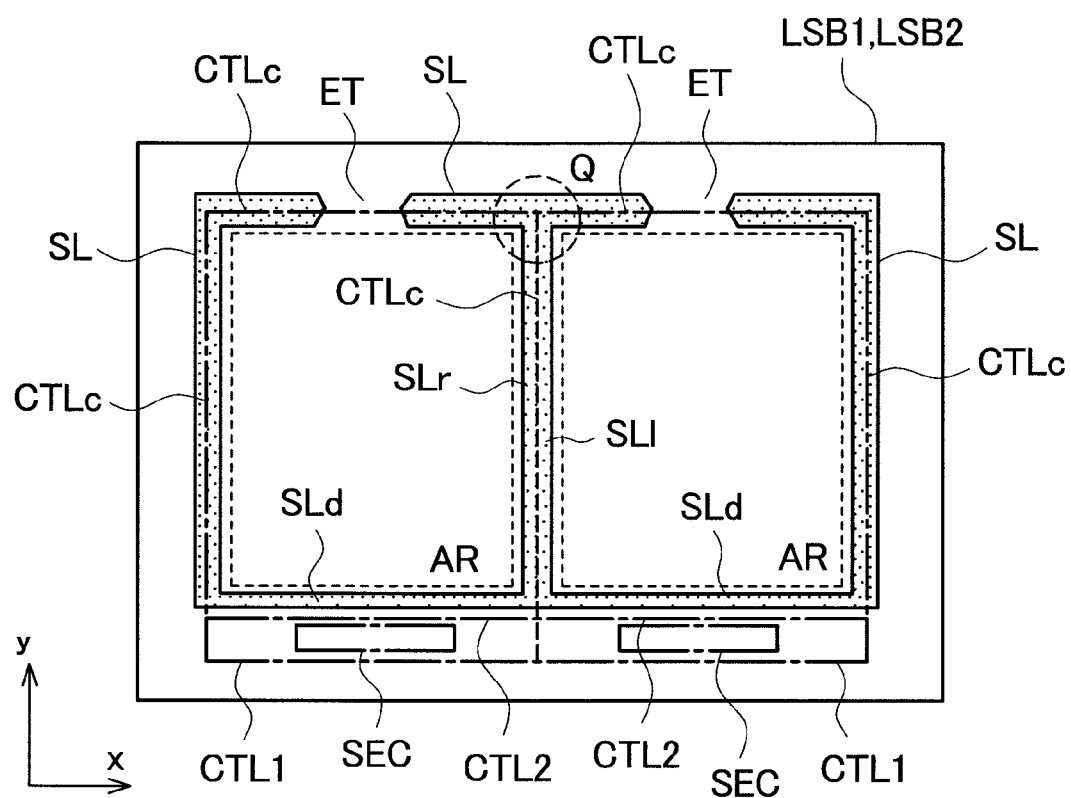
FIG. 3 shows an example of a manufacturing method of a liquid crystal display device of the invention.

FIG. 3 shows an example of a manufacturing method when the sealing material SL is configured as described above for the substrates SUB1 and SUB2. In FIG. 3, multi-piece substrates LSB1 and LSB2 are bonded together by the sealing material SL. In the display region AR on facing surfaces of the multi-piece substrates LSB1 and LSB2, signal lines, thin film transistors, pixel electrodes, color filters, and the like have already been formed. In the case of FIG. 3, the multi-piece substrates LSB1 and LSB2 are substrates from which, for example, two liquid crystal cells can be taken, for simplifying the description, and therefore the two liquid crystal cells are arranged side by side in the drawing. With this arrangement, the sealing material SL is formed in a pattern in which rectangular frames (each including the opening ET) are arranged side by side in the drawing. In this case, the sealing material SL is formed into a pattern in which a sealing material (indicated by reference sign SLr in the drawing) on the right in the drawing in the rectangular frame on the left in the drawing and a sealing material (indicated by reference sign SL1 in the drawing) on the left in the drawing in the rectangular frame on the right in the drawing are used in common. At the stage shown in FIGS. 2A and 2B, the semiconductor device SEC is not yet mounted. However, for facilitating the understanding of the correspondence between FIG. 3 and FIG. 2A, the mounting region of the semiconductor device SEC is indicated by the two-dot chain line SEC in the drawing.

In FIG. 3, the dashed-dotted lines show the cutting positions of the multi-piece substrates LSB1 and LSB2. As shown in FIG. 3, the cutting position (indicated by reference sign CTL1 in the drawing) of the side of the multi-piece substrate LSB1 on the side where the semiconductor device SEC is mounted is different from the cutting position (indicated by reference sign CTL2 in the drawing) of the side of the multi-piece substrate LSB2 on the side where the semiconductor device SEC is exposed. However, on the other three sides excluding the two sides, the multi-piece substrate LSB1 and the multi-piece substrate LSB2 are collectively cut. Therefore, the cutting positions (indicated by reference sign CTLc in the drawing) of the multi-piece substrate LSB1 and the multi-piece substrate LSB2 overlap and coincide with each other.

The multi-piece substrate LSB1 and the multi-piece substrate LSB2 are collectively cut at substantially the center of the sealing material SL along the sealing material SL. Therefore, when focusing on the sealing material SL in one liquid crystal cell, the sealing material SL positioned inside a cutting line for separating the liquid crystal cell is used as the sealing material SL of the liquid crystal cell, while the sealing material SL positioned outside the cutting line is removed together with the multi-piece substrate LSB1 and the multi-piece substrate LSB2 or is used as a sealing material in another liquid crystal cell adjacent thereto like the sealing material indicated by SLr or SL1 in the drawing.

Returning to FIGS. 2A and 2B, between the substrate SUB1 and the substrate SUB2 in the display region AR, columnar spacers PSP are formed in a dispersed manner for setting the gap between the substrate SUB1 and the substrate SUB2 at a predetermined value. In FIGS. 2A and 2B, although the columnar spacers PSP are shown in part of the display region AR, the columnar spacers are formed actually in the entire area of the display region AR in a uniform distribution. The columnar spacer PSP is formed by selectively etching, for example, a resin layer formed on the surface of the substrate SUB2 on the liquid crystal side by a photolithography technique. This provides an advantage that the columnar spacer can be formed at a predetermined position with a predetermined height. The formation of the columnar spacers PSP is not limited to the substrate SUB2 side, but the columnar spacers PSP may be formed on the substrate SUB1 side. In FIGS. 2A and 2B, the columnar spacer having a relatively large diameter is illustrated for facilitating its recognition. However, the columnar spacer is disposed between adjacent pixels, for example, and therefore has a small diameter.

Figure 1B:
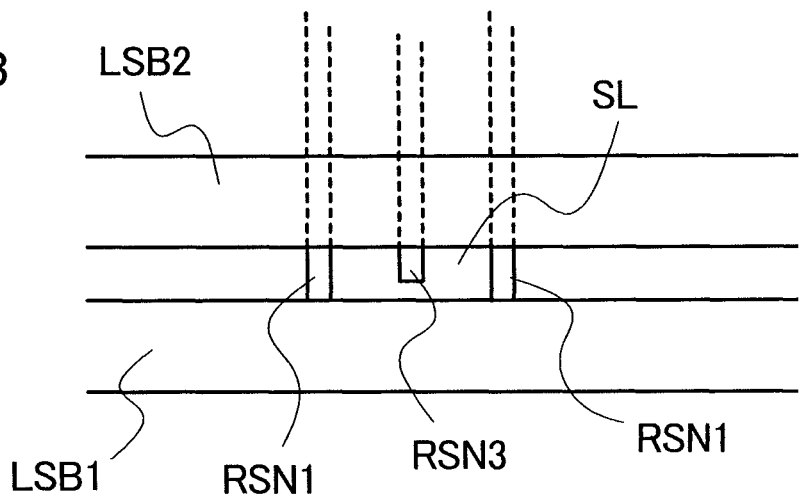

FIGS. 1A and 1B show a dotted circle portion Q in FIG. 3 in an enlarged scale. FIG. 1A is a plan view, and FIG. 1B is a cross-sectional view taken along line SC-SC of FIG. 1A.

In FIGS. 1A and 1B, on the inner circumference side and the outer circumference side of the forming region of the sealing material SL on the surface of the multi-piece substrate LSB2 on the liquid crystal side, narrow resin layers RSN1 and RSN2 are respectively formed along the longitudinal direction of the sealing material SL. Each of the resin layers RSN1 and RSN2 is formed in a bank-shape pattern which is closed and continues around the entire circumference of the forming region of the sealing material SL. The sealing material SL is applied so as to be filled in the region surrounded by the resin layers RSN1 and RSN2. With this configuration, the resin layers RSN1 and RSN2 have a function as a weir of the sealing material SL. Therefore, the resin layers RSN1 and RSN2 prevent the sealing material SL from flowing to the display region AR side, making it possible to keep the forming region of the sealing material SL only within a width W (effective width) in the drawing. Accordingly, an advantage that the distance (indicated by w in FIG. 2A) between the display region AR and the sealing material SL can be designed narrow is provided.

The resin layers RSN1 and RSN2 also have a function of preventing the intrusion of the liquid crystal LC into the sealing material SL, for example. If the resin layers RSN1 and RSN2 are not disposed, the liquid crystal LC reaches the sealing material SL before the sealing material SL is solidified, the liquid crystal LC intrudes into the sealing material SL, and the effective width of the sealing material SL becomes narrow. Therefore, the intrusion of the liquid crystal LC into the sealing material SL is blocked by the resin layers RSN1 and RSN2 which are harder than the sealing material SL so that the effective width W of the sealing material SL can be kept.

At substantially the center of the forming region of the sealing material SL in the width direction on the surface of the multi-piece substrate LSB2 on the liquid crystal side, a narrow resin layer RSN3 is formed along the longitudinal direction of the sealing material SL. The portion where the resin layer RSM3 is formed serves as a portion along which the multi-piece substrates LSB2 and LSB1 are collectively cut. As will be apparent from FIG. 1B, the resin layer RSN3 is formed so as to have a height less than the gap between the multi-piece substrates LSB2 and LSB1 determined by the resin layers RSN1 and RSN2. That is, whereas the resin layers RSN1 and RSN2 are formed such that the top thereof (end opposite from a fixed end) abuts on the multi-piece substrate LSB1 side, the resin layer RSN3 has substantially half the height of the resin layers RSN1 and RSN2, and the top thereof is formed so as not to abut on the multi-piece substrate LSB1 side. With this configuration, a cut surface between the substrates SUB1 and SUB2 formed by collectively cutting the multi-piece substrates LSB2 and LSB1 is in a state where the resin layer RSN3 and the sealing material SL are formed in layers from the substrate SUB2 side to the substrate SUB1 side. In this case, when only the sealing material SL is present (the resin layer RSN3 is not formed) at the cut surface between the multi-piece substrates LSB1 and LSB2 (that is, the cut surface of the liquid crystal display device) at the position where the multi-piece substrates LSB2 and LSB1 are collectively cut, there arises a disadvantage that it is difficult to prevent the entry of moisture. When only the resin layer RSN3 is present (the resin layer RSN3 has the same height as that of the resin layers RSN1 and RSN2) at the cut surface between the multi-piece substrates LSB1 and LSB2, there arises a disadvantage that it is difficult to collectively cut the multi-piece substrates LSB1 and LSB2. In view of this as described above, the resin layer RSN3 and the sealing material SL are present separately depending on the regions at the cut surface between the multi-piece substrates LSB1 and LSB2, whereby an improvement in cutting performance and the prevention of moisture intrusion can be provided together. The resin layer RSN3 has greater resistance to the intrusion of moisture than the sealing material SL and fixed to one side, for example, to the multi-piece substrate LSB2 side. Therefore, the resin layer RSN3 can sufficiently block the intrusion of moisture also at this fixed portion.

The resin layers RSN1, RSN2, and RSN3 are formed simultaneously when the columnar spacer PSP is formed, for example. This makes it possible to avoid an increase in the number of manufacturing steps in forming the resin layers RSN1, RSN2, and RSN3. In this case, the resin layers RSN1 and RSN2 have a height greater than that of the resin layer RSN3. However, an intervening layer is disposed between the resin layers RSN1 and RSN2 and the multi-piece substrate LSB2, and an intervening layer is not disposed between the resin layer RSN3 and the multi-piece substrate LSB2, whereby the resin layers RSN1, RSN2, and RSN3 can be easily configured. The intervening layer can be formed of the same material as that of a material layer (for example, the black matrix or color filter) formed on the multi-piece substrate LSB2 side. However, this is not restrictive. The resin layer RSN3 may be formed so as to have a height less than that of the resin layers RSN1 and RSN2 without providing the intervening layer and using an identical underlayer in the resin layers RSN1, RSN2, and RSN3.

Although FIGS. 1A and 1B show the part (the dotted circle portion Q in FIG. 3) of the forming region of the sealing material SL between the multi-piece substrates LSB1 and LSB2, the other parts of the forming region of the sealing material SL are formed in a similar manner. However, in a forming region of a sealing material SL (indicated by reference sign SLd in FIG. 3) formed on the side where the semiconductor device SEC is mounted, the resin layers RSN1 and RSN2 are formed, but the resin layer PSN3 is not formed. This is because the multi-piece substrates LSB1 and LSB2 are not to be collectively cut along the sealing material SL on the side where the semiconductor device SEC is mounted.

Moreover, since FIGS. 1A and 1B show the case where two liquid crystal cells are taken from the multi-piece substrates LSB1 and LSB2, the resin layer RSN2 (the same applies to a resin layer RSN5 in the following embodiments) does not remain in a liquid crystal cell after the multi-piece substrates LSB1 and LSB2 are cut. In FIG. 3, however, when the sealing material SL is formed in a pattern which is line-symmetric vertically in the drawing with respect to the side where the opening ET of the sealing material SL is formed so that two by two, that is, four liquid crystal cells are taken for example, the resin layer RSN2 (the same applies to the resin layer RSN5 in the following embodiments) has a function similar to that of the resin layer RSN1 (and a resin layer RSN4 in the following embodiments) on the side of a not-shown liquid crystal cell.

[Second Embodiment]

Figure 4A:
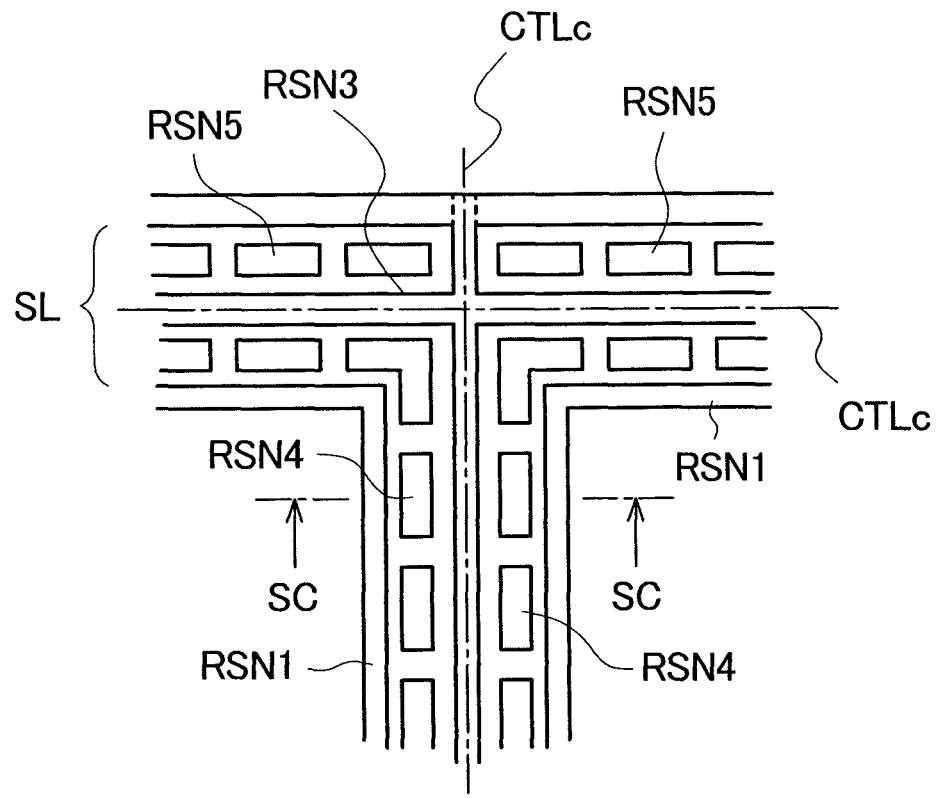
FIGS. 4A and 4B are configuration views of a main part showing a second embodiment of a liquid crystal display device of the invention.
Figure 4B:
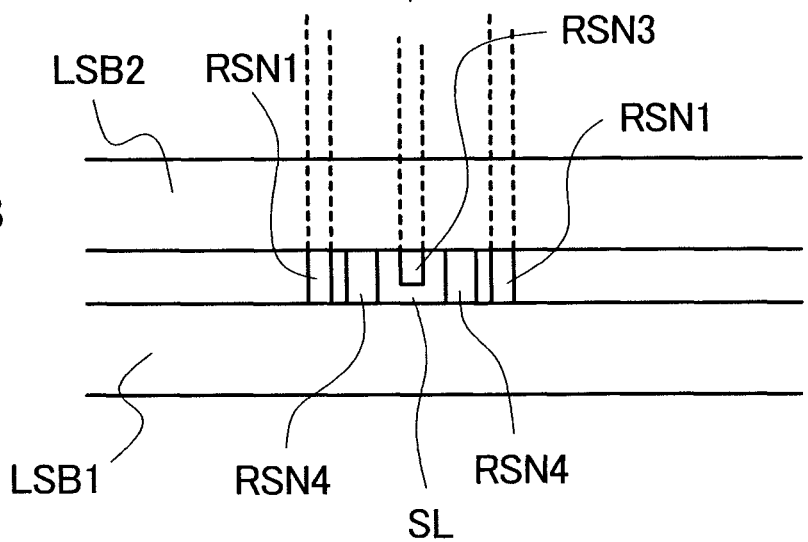

FIGS. 4A and 4B are configuration views showing a second embodiment of a liquid crystal display device of the invention and correspond to FIGS. 1A and 1B, respectively.

The configuration of FIGS. 4A and 4B differs from that of FIGS. 1A and 1B in that in a region between the resin layer RSN1 and the resin layer RSN3, a plurality of the resin layers RSN4 are formed along the longitudinal direction of the region. These resin layers RSN4 are formed so as to have a gap between the adjacent resin layers RSN4, between the resin layer RSN4 and the resin layer RSN1, and between the resin layer RSN4 and the resin layer RSN3. Moreover, in a region between the resin layer RSN3 and the resin layer RSN2, a plurality of the resin layers RSN5 are formed along the longitudinal direction of the region. These resin layers RSN5 are formed so as to have a gap between the adjacent resin layers RSN5, between the resin layer RSN5 and the resin layer RSN3, and between the resin layer RSN5 and the resin layer RSN3. The height of the resin layers RSN4 and RSN5 is the same as that of the resin layers RSN1 and RSN2 and greater than that of the resin layer RSN3.

The resin layers RSN4 and RSN5 are disposed to block the intrusion of liquid crystal, thereby improving an advantage of preventing the intrusion of liquid crystal together with the resin layers RSN1 and RSN2.

Moreover, the resin layers RSN4 and RSN5 are arranged discontinuously along the circumferential direction. Therefore, a reduction in contact area between the sealing material SL and the multi-piece substrates LSB1 and LSB2 is avoided, and the impairment of adhesion between the sealing material SL and the multi-piece substrates LSB1 and LSB2 is prevented. However, this is not restrictive. For example, at least one of the resin layers RSN4 and RSN5 may be formed continuously in the same manner as the resin layers RSN1 and RSN2.

[Third Embodiment]

Figure 5A:
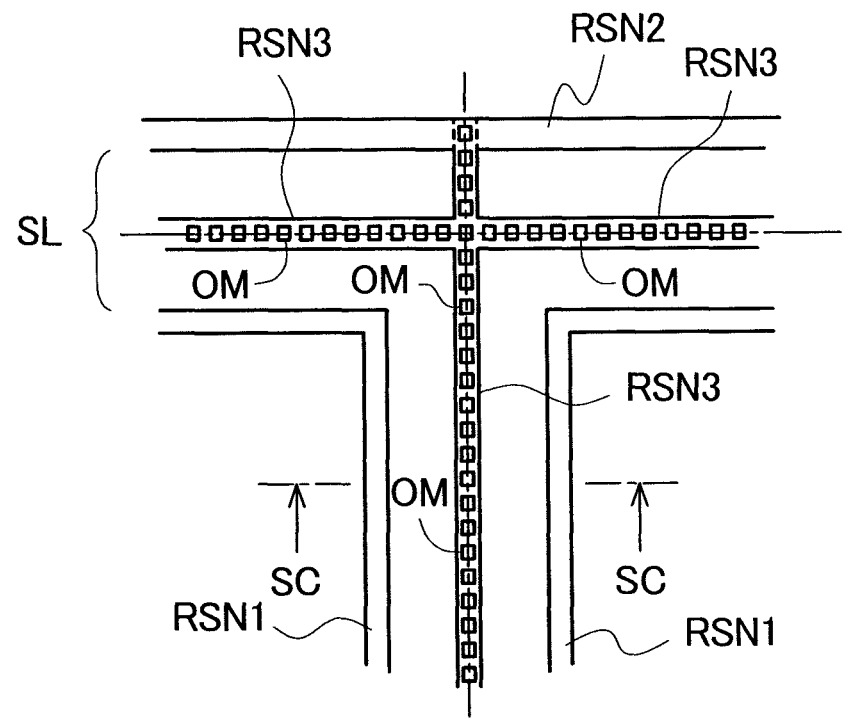
FIGS. 5A and 5B are configuration views of a main part showing a third embodiment of a liquid crystal display device of the invention.
Figure 5B:
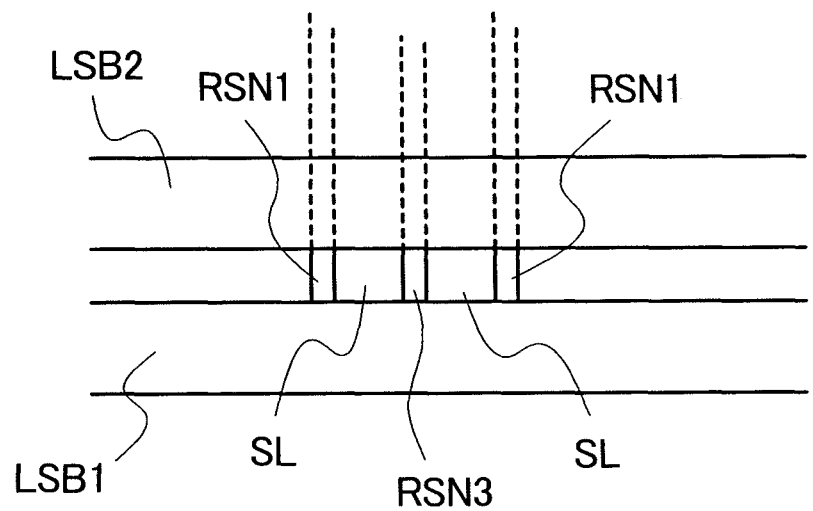

FIGS. 5A and 5B are configuration views showing a third embodiment of a liquid crystal display device of the invention and correspond to FIGS. 1A and 1B, respectively.

The configuration of FIGS. 5A and 5B is different from that of FIGS. 1A and 1B in the resin layer RSN3. The other parts of the configuration are similar to those of FIGS. 1A and 1B. The resin layer RSN3 has the same height as that of the resin layers RSN1 and RSN2. The resin layer RSN3 has, when viewed in a plane, a plurality of openings OM formed in parallel along the longitudinal direction of the resin layer RSN3. In this case, when the sealing material SL is applied, the sealing material SL is formed by filling not only into the region between the resin layer RSN1 and the resin layer RSN3 and the region between the resin layer RSN3 and the resin layer RSN2 but also inside the openings OM formed in the resin layer RSN3.

The multi-piece substrates LSB2 and LSB1 are to be collectively cut along a line (dashed-dotted line) obtained by connecting substantially the centers of the openings OM in the resin layer RSN3.

In this case, a cut surface between the substrates SUB1 and SUB2 formed by collectively cutting the multi-piece substrates LSB2 and LSB1 is in a state where the resin layer RSN3 and the sealing material SL are alternately arranged along the circumferential direction of the substrates SUB1 and SUB2. Accordingly, since the sealing material SL is formed in addition to the resin layer RSN3 at the cut surface between the substrates SUB1 and SUB2, an improvement in cutting performance can be achieved, while since the resin layer RSN3 is present in addition to the sealing material SL, the prevention of moisture intrusion can be achieved.

[Fourth Embodiment]

Figure 6A:
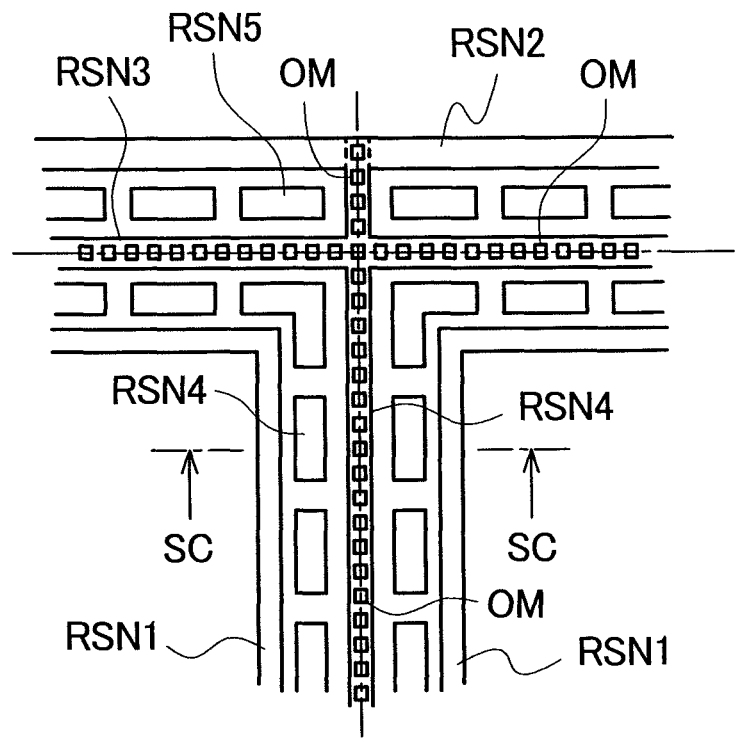
FIGS. 6A and 6B are configuration views of a main part showing a fourth embodiment of a liquid crystal display device of the invention.
Figure 6B:
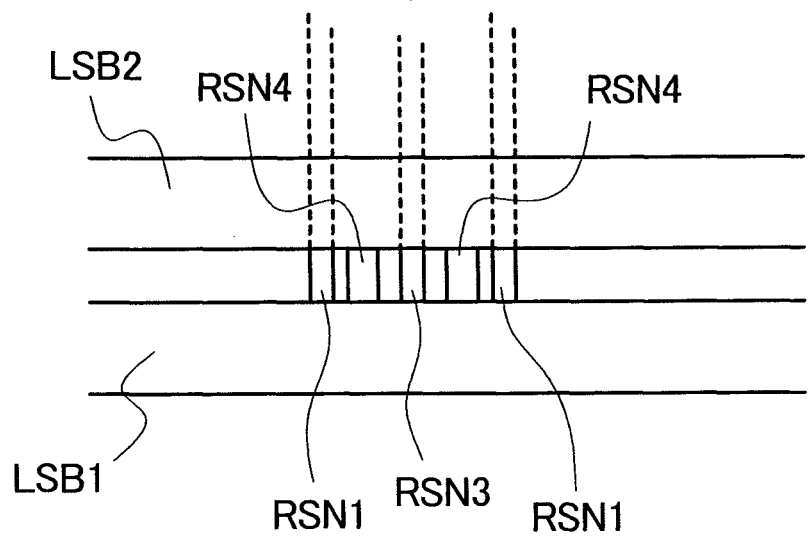

FIGS. 6A and 6B are configuration views showing a fourth embodiment of a liquid crystal display device of the invention and correspond to FIGS. 5A and 5B, respectively.

The configuration shown in FIGS. 6A and 6B is obtained by making improvements to the configuration shown in FIGS. 5A and 5B in the same manner as shown in FIGS. 4A and 4B which is obtained by making improvements to the configuration of FIGS. 1A and 1B.

In the same manner as in FIGS. 5A and 5B, the resin layer RSN3 has the plurality of openings OM formed in parallel along the longitudinal direction of the resin layer RSN3. The sealing material SL is formed by filling not only into the region between the resin layer RSN1 and the resin layer RSN3 and the region between the resin layer RSN3 and the resin layer RSN2 but also inside the openings OM formed in the resin layer RSN3.

The plurality of resin layers RSN4 are formed in the region between the resin layer RSN1 and the resin layer RSN3 along the longitudinal direction of the region. Moreover, the plurality of resin layers RSN5 are formed in the region between the resin layer RSN3 and the resin layer RSN2 along the longitudinal direction of the region. The resin layers RSN4 and RSN5 have the same height as that of the resin layers RSN1 and RSN2. With this configuration, in the same manner as shown in FIGS. 4A and 4B, an advantage of reliably preventing the intrusion of liquid crystal can be provided.

[Fifth Embodiment]

In the above-described embodiments, the resin layers RSN1, RSN2, RSN3, RSN4, and RSN5 are formed on the substrate SUB2 side. However, this is not restrictive, and the resin layers may be configured on the substrate SUB1 side. Further, some of the resin layers may be formed on the substrate SUB2 side, and the remaining resin layers may be formed on the substrate SUB1 side.

While the invention has been described by using the embodiments, the configurations described in the embodiments are illustratively only. The invention can be modified appropriately within a range not departing from the technical idea thereof. The configurations described in the embodiments may be used in combination as long as they do not conflict with each other.

What is claimed is:

1. A liquid crystal display device comprising:
   a first substrate and a second substrate which are disposed to face each other with liquid crystal interposed therebetween; and a sealing material which is disposed between the first substrate and the second substrate to seal the liquid crystal, the first substrate and the second substrate having side surfaces including a cut surface formed by cutting the first substrate and the second substrate along a portion where the sealing material is disposed, wherein a first resin layer is provided along the sealing material in a region where the sealing material is disposed on the first substrate or the second substrate, the first resin layer has a height less than a gap between the first substrate and the second substrate in a display region, and the first resin layer and the sealing material are exposed at the surface where the first substrate and the second substrate are cut, and the sealing material is disposed between the first resin layer and the first substrate or the second substrate.

2. The liquid crystal display device according to claim 1, further comprising a columnar spacer in the display region surrounded by the sealing material, wherein the columnar spacer is formed on the second substrate side, and the first resin layer is formed on the second substrate side and formed of the same material as that of the columnar spacer, and the sealing material is disposed between the first resin layer and the first substrate.

3. The liquid crystal display device according to claim 1, wherein a second resin layer is formed apart from the first resin layer on the display region side of the region where the sealing material is disposed, and the second resin layer has a height greater than that of the first resin layer.

4. The liquid crystal display device according to claim 3, further comprising a columnar spacer in the display region surrounded by the sealing material, wherein the columnar spacer is formed on the second substrate side, and the first resin layer and the second resin layer are formed on the second substrate side and formed of the same material as that of the columnar spacer, and the sealing material is disposed between the first resin layer and the first substrate.

5. The liquid crystal display device according to claim 4, wherein the second resin layer has the height greater than that of the first resin layer due to a layer formed between the second resin layer and the second substrate.

6. A manufacturing method of a liquid crystal display device comprising:

applying a sealing material in a pattern which is continuous and closed on a surface of a first multi-piece substrate;

bonding a second multi-piece substrate to the first multi-piece substrate with a gap via the sealing material; and forming a liquid crystal cell by at least collectively cutting the first multi-piece substrate and the second multi-piece substrate along the sealing material in a forming region of the sealing material, wherein a resin layer having a height less than the gap is formed at the cutting position in the forming region of the sealing material on at least one of the first multi-piece substrate and the second multi-piece substrate before applying the sealing material.

* * * * *